United States Patent [19]
Baker

[11] 3,926,057
[45] Dec. 16, 1975

[54] SPIRAL MANOMETER
[75] Inventor: Roy V. Baker, Lubbock, Tex.
[73] Assignee: The United States of America as represented by the Secretary of Agriculture, Washington, D.C.
[22] Filed: Sept. 26, 1974
[21] Appl. No.: 509,596

[52] U.S. Cl. ................................ 73/401
[51] Int. Cl.² .......................... G01L 7/18
[58] Field of Search ............... 73/401, 147, 205 R

[56] References Cited
UNITED STATES PATENTS
| | | | |
|---|---|---|---|
| 841,454 | 1/1907 | Sargent | 73/401 |
| 3,209,597 | 10/1965 | Fowler | 73/401 |

Primary Examiner—Donald O. Woodiel
Attorney, Agent, or Firm—M. Howard Silverstein; Max D. Hensley

[57] ABSTRACT

A new apparatus for measuring fluid (liquid and gas) pressure is disclosed. Specifically, this apparatus consists of a uniquely constructed manometer wherein the inclined leg member comprises a transparent tubing spirally wound around a vertical cylinder which is mounted on a flat round horizontal base plate. The vertical cylinder contains an internally affixed fluid reservoir. The flat round horizontal base plate comprises a system of vertical leveling screws and a leveling bubble for alignment.

9 Claims, 4 Drawing Figures

SPIRAL MANOMETER

This invention relates to an apparatus for measuring fluid (liquid and gas) pressure. More specifically, this invention relates to a new manometer which is uniquely constructed so that its inclined leg is spirally wound onto a cylinder instead of lying in a single plane as is the case of other manometers.

In the prior art the literature teaches that manometers are liquid level gages in which the pressure to be measured is balanced by a column of liquid of known weight. The height of the liquid column is normally used to express the pressure in units of inches of mercury or inches of water. Several types of manometers which are available include the simple U-tube, single-leg well-type, single leg inclined-tube, multi-tube, curved-tube, null-reading manometer, and various precision micromanometers. The many types of available manometers provide a selection to meet special-purpose needs.

The instant invention has some features that are similar to a single-leg inclined-tube manometer. Specifically, the invention utilizes a single inclined leg and reservoir (well) as does a single-leg inclined-tube type. More specifically, the invention utilizes the inclined-leg principal spirally wound on a cylinder. This new and unique feature enables the construction of a compact manometer that has a wide indicating range with the sensitivity of an inclined manometer. This makes the invention useful for applications which require precise measurements over a wide range of pressures.

The main objective of this invention is to build a device for measuring fluid pressure.

Another object of the invention is to build a versitile and compact manometer.

A third object is to build a manometer that had sufficient range to measure pressures in pneumatic conveying systems, plus or minus approximately 24 inches of water.

A fourth objective is to build a manometer that meets objects two and three and still has the precision of an inclined manometer. It was designed to measure pressures to the nearest 0.01 inch of water.

Other objects and advantages of this invention will further become apparent hereinafter and in the drawings, in which.

Figure 1:
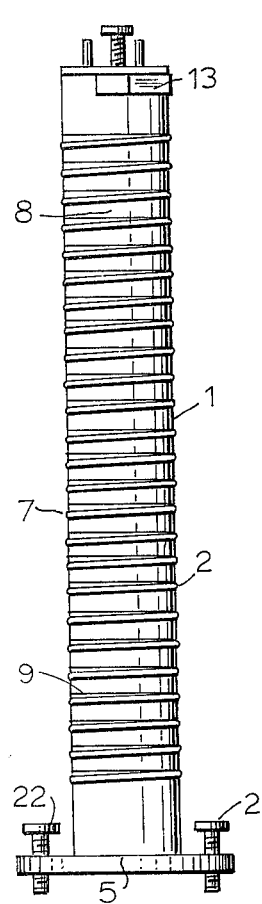
FIG. 1 is a side view of a spiral manometer showing the various parts of the device in relation to each other as typically assembled.
Figure 2:
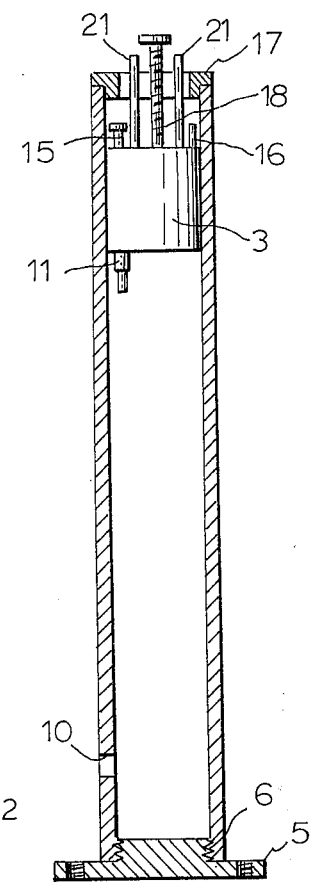
FIG. 2 is a side view of a cross-section of the manometer showing the internal arrangement of parts.
Figure 3:
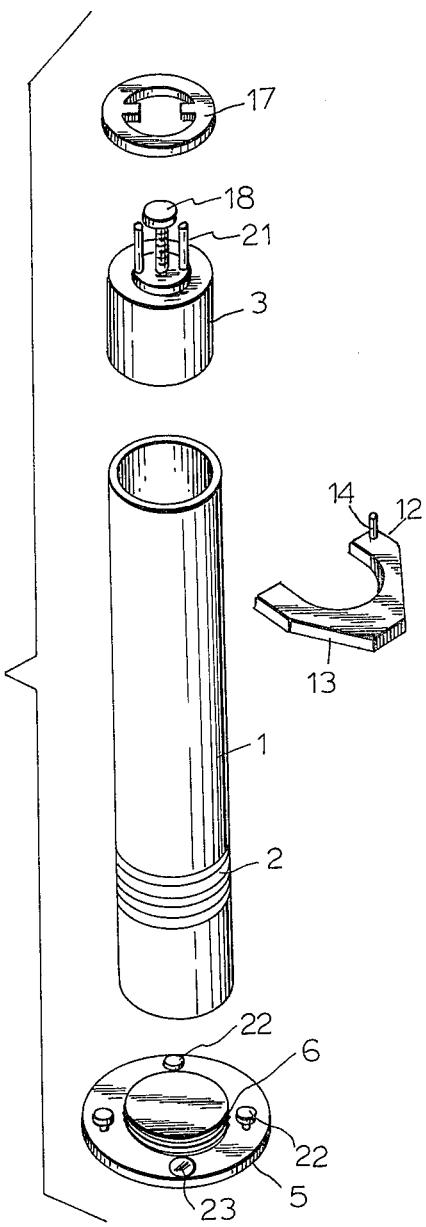
FIG. 3 is an expanded view in perspective showing the primary components in relation to each other, with parts broken away to illustrate important details.
Figure 4:
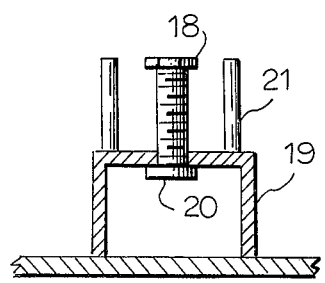
FIG. 4 is a side view of a cross-section of the method of attaching the adjusting bolt to the reservoir.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 1 designates a 30-inch long cylindrical tube with a 4-inch outside diameter and a 3½-inch inside diameter which was used to construct a vertical member to support the spiral tubing 2 and reservoir 3. Cylindrical tube 1 is attached to an 8-inch diameter base 5 by means of threads 6 which are cut into the inside surface of cylindrical tube 1 and the outside surface of base 5. Tube 1 can be constructed by chucking into a universal milling machine with a spiral lead attachment and precisely cutting by standard methods a spiral groove 7 of semi-circular cross section along a length of tube 1 starting 2½ inches from the bottom and ending 2½ inches from the top. The spiral is such that for each revolution about tube 1 groove 7 advanced 0.978 inches. Thus the diameter of groove 7 is equal to the outside diameter of spiral tubing 2. Tube 1 is then indexed about its circumference with easily visible vertical lines. One-hundred equally spaced divisions 8 are lightly cut into the surface of tube 1 along its entire length. Every tenth vertical division 8 is colored to distinguish 10ths of an inch rise in spiral tubing 2, and numbered from 0 to 10. The vertical distance along cylindrical tube 1 is indicated by horizontal rings 9 spaced 0.978 inches apart in the vertical direction along the length of cylindrical tube 1 which is wound with spiral tubing 2. Rings 9 are numbered consecutively from 0 starting at the uppermost and progressing to 24 at the lowermost.

Transparent spiral tubing 2 is wrapped around tube 1 and fitted into groove 7. The lower end of the tubing was routed through a round hole 10 in the side of cylindrical tube 1 and attached to a standard tubing connection 11 in the bottom of reservoir 3. The upper end of the spiral tubing 2 is attached to the lower end of a tubing connection 12 mounted on yoke 13. The top end of this connection 12 forms the high pressure port 14. The spiral tubing 2 is a commercial type of tubing that is transparent, flexible and with an inside diameter of approximately one-eighth inch and an outside diameter of one-fourth inch. Fluid reservoir 3 is of sufficient size to service the manometer and form on leg of the manometer. Spiral tubing 2 forms the other leg of the manometer. Two openings are provided in the top of reservoir 3. Access opening 15 is provided for adding fluid. During operation of the manometer opening 15 is closed air tight with a standard screw-on brass cap. Another opening on top of reservoir 3 is fitted with a standard tubing connection and forms low-pressure port 16. Ring 17 supports reservoir 3 and rests on top of tube 1. Adjusting bolt 18 is threaded through a central hole in ring 17 and attaches to the top of reservoir 3 by means of inverted cup 19 and shoulder 20 on the end of the bolt. This allows adjusting bolt 18 to be rotated without rotating the reservoir, but yet raising or lowering it. Two guide pins 21 attach to reservoir 3 and protruding through two circular holes in ring 17 keep the reservoir in rotational alignment. A hole in the bottom of reservoir 3 is equipped with standard tubing connection 11.

In operating the spiral manometer tube 1 is first aligned vertically by means of three leveling screws 22 and leveling bubble 23 which is attached to base 5. Distilled water is added to fill spiral tubing 2 and part of reservoir 3. Reservoir 3 is adjusted up or down to bring the height of water level in the tubing 2 to the zero point on tube 1. The pressure to be measured is then connected to ports 14 and 16. In measuring a positive pressure (one above atmospheric) the connection is made to the high pressure port 12. Connection is made to the low pressure port 16 to measure pressures less than atmospheric pressure. For a differential pressure, the higher pressure is connected to port 12 and the lower to port 16. The application of pressure to the ports cause the fluid level to change in order to balance the pressure difference. This pressure is measured directly in inches of water by reading the change in fluid level in spiral tubing 2. This is conveniently accomplished by first reading the number of the horizontal ring 9 directly above the new fluid level which indicates whole inches. Tenths of an inch are determined by the number on the colored vertical division 8 immediately to the right of the fluid level. Hundredths of an inch are determined by counting to the right the number of vertical divisions 8 between the fluid level and the colored tenths division mentioned above.

The lead of spiral tubing 2 is selected to compensate for changes in the fluid level in reservoir 3 which occurred as a result of a change in fluid level in tubing 2.

The embodiment described herein used a lead of 0.978 inches. However, the lead needed for other sizes of components can differ from the one used herein, but can be easily calculated since it depends on the inside diameter of spiral tubing 2, the inside diameter of reservoir 3 and the diameter of tube 1. When one inch of pressure is imposed on the manometer, the fluid level in spiral tubing 2 changes by 0.978 inches and the level in reservoir 3 changes by 0.022 inches for a total 1.000 inches.

It is intended that the specific embodiment of invention described here not be limited to the dimensions as described. The dimensions used in this embodiment were selected in many cases because they were convenient at the time of construction. It should be understood that similar spiral manometers performing exactly the same function can be constructed using different dimensions or other materials.

Having thus described my invention, I claim:
1. An apparatus for measuring pressure comprising:
   a. a vertical cylindrical support tube comprising:
      1. a spiral groove circumscribing the outer surface of the vertical cylinder from the top to the bottom in equidistant spirals,
      2. a plurality of equidistant vertical lines for indexing, inscribed on the outer surface of the vertical cylinder substantially the full length thereof,
      3. a plurality of equidistant horizontal rings inscribed around the circumference of the outer surface and spaced and numbered from the top to the bottom of the vertical cylinder for indicating vertical distance measurements,
      4. an access hole located near the lower end of the vertical support cylinder to allow for access of
   b. a transparent spiral tubing substantially of size and length to fit the spiral groove and attaching to
   c. a fluid reservoir member, designed and located to fit inside the upper top section of the vertical support cylinder and comprising:
      1. a standard connecting means for connecting the lower and upper of the spiral tubing,
      2. an access opening for adding fluid to the reservoir,
      3. a standard connecting means utilized as a low pressure port, located on the top of the fluid reservoir to allow for pressure differential measurement,
      4. a yoke member affixed to the outer top circumference of the vertical support cylinder and used to support a standard connection fitting which is installed through the yoke in such a manner that the top end of the transparent spiral tubing can be connected to the bottom of the fitting and the top of the standard connection forms the high pressure port as well as a connecting device for pressure differential measurement,
      5. a means of attaching the reservoir to a
      6. top ring designed to fit and substantially form the top of the vertical cylinder, said top ring also having two holes for guide pins which function for alignment of the reservoir with the top ring,
   d. a base member for support of the vertical cylinder comprising:
      1. a round flat horizontal base piece with a male threaded center insert portion designed to fit the inside diameter of the female threaded vertical cylinder which is threaded on the inside diameter of the vertical cylinder thereby allowing the base to screw into the vertical support cylinder,
      2. a level bubble attached to the upper surface of the round flat horizontal base piece to allow for visual leveling of the entire device,
      3. a leveling means.
2. The apparatus as defined in claim 1 wherein the vertical cylinder is thirty inches long with a four inch outside diameter and a three and one-half inch inside diameter.
3. The apparatus as defined in claim 1 wherein the equidistant spirals are spaced 0.978 inches apart and start 2½ inches from the bottom and end 2½ inches from the top.
4. The apparatus as defined in claim 1 wherein there are 100 equally spaced vertical inscribed lines with each tenth division color coded for distinguishing the tenths of an inch.
5. The apparatus as defined in claim 1 wherein the horizontal inscribed rings are spaced 0.978 inches apart.
6. The apparatus as defined in claim 1 wherein the means of attaching the reservoir to the top ring is a threaded screw fitting.
7. The apparatus as defined in claim 1 wherein the leveling means consists of three leveling screws in the horizontal base member.
8. The apparatus as defined in claim 1 wherein the fluid in the reservoir is water.
9. The apparatus as defined in claim 1 wherein the transparent spiral tubing functions as the inclined leg of a manometer.

* * * * *